Jan. 5, 1954　　G. C. HILLENBRAND ET AL　　2,664,615
CASKET INTERIOR UNIT
Filed July 24, 1950　　　　　　　　　　　　　　7 Sheets-Sheet 1

INVENTORS
George C. Hillenbrand
and Millard J. Langle
BY
Wood, Arey, Henn & Evans
ATTORNEYS

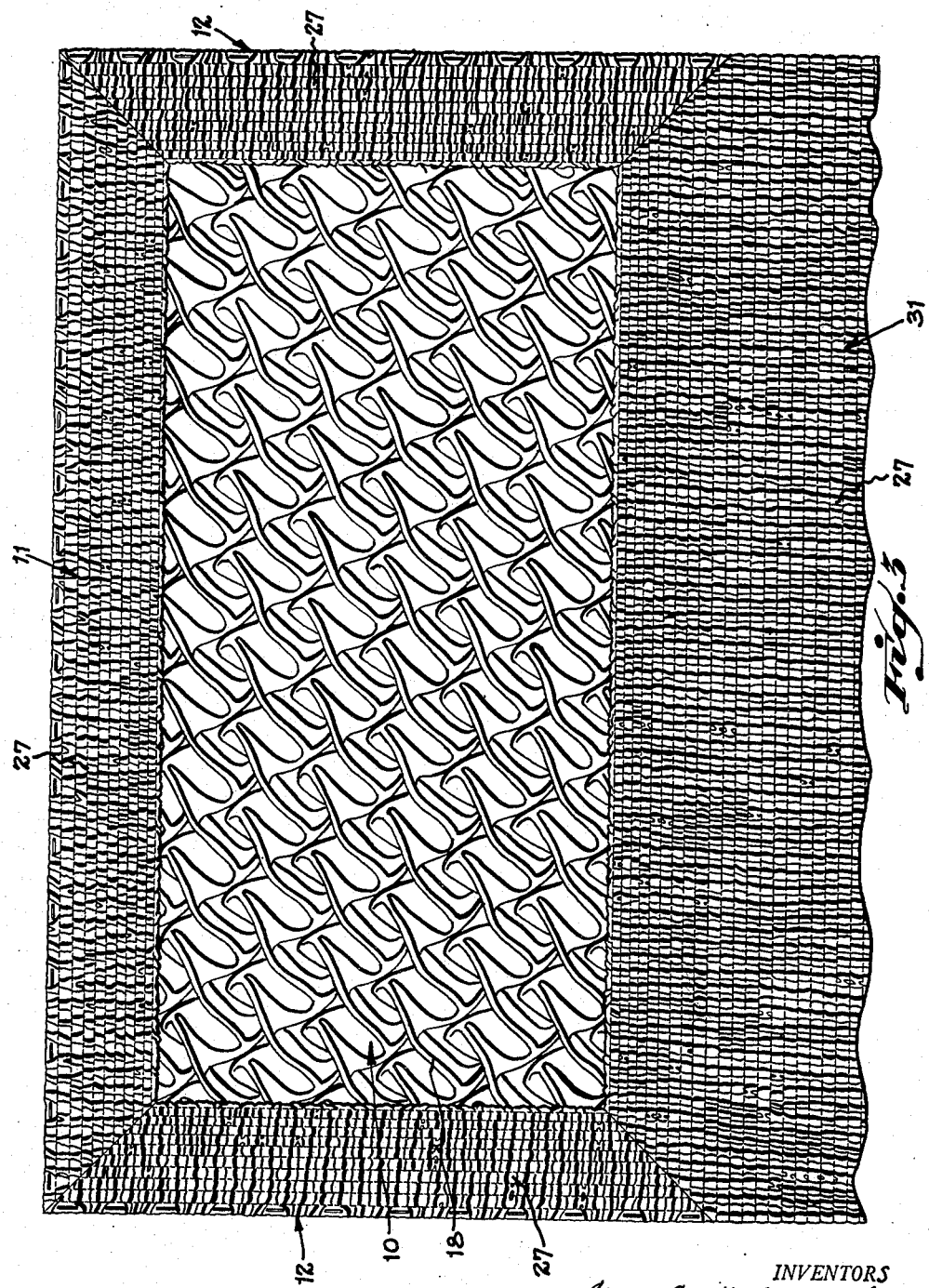

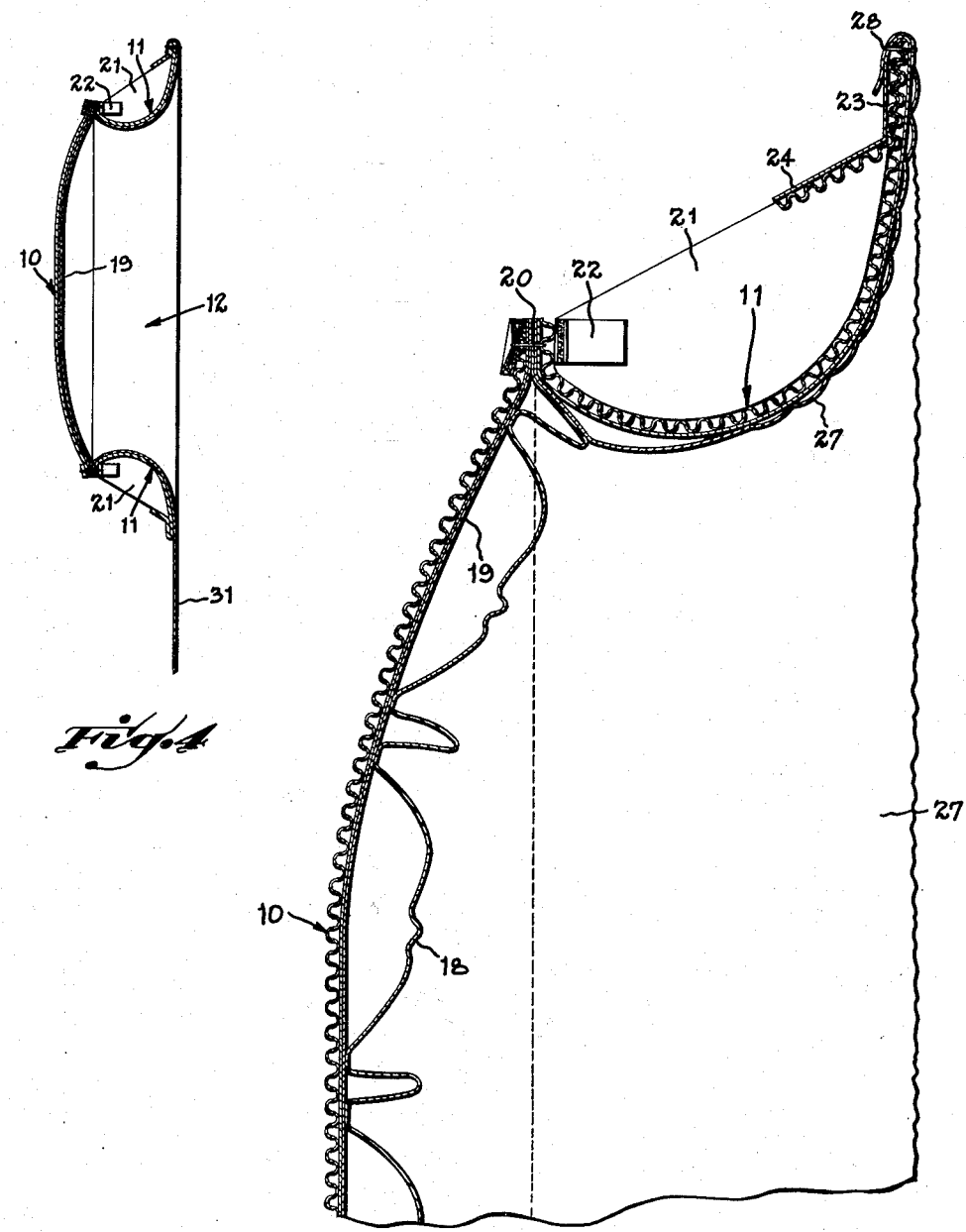

Jan. 5, 1954  G. C. HILLENBRAND ET AL  2,664,615
CASKET INTERIOR UNIT
Filed July 24, 1950  7 Sheets-Sheet 4

INVENTORS
George C. Hillenbrand
and Millard J. Langle
BY
Wood, Arey, Herron & Evans
ATTORNEYS

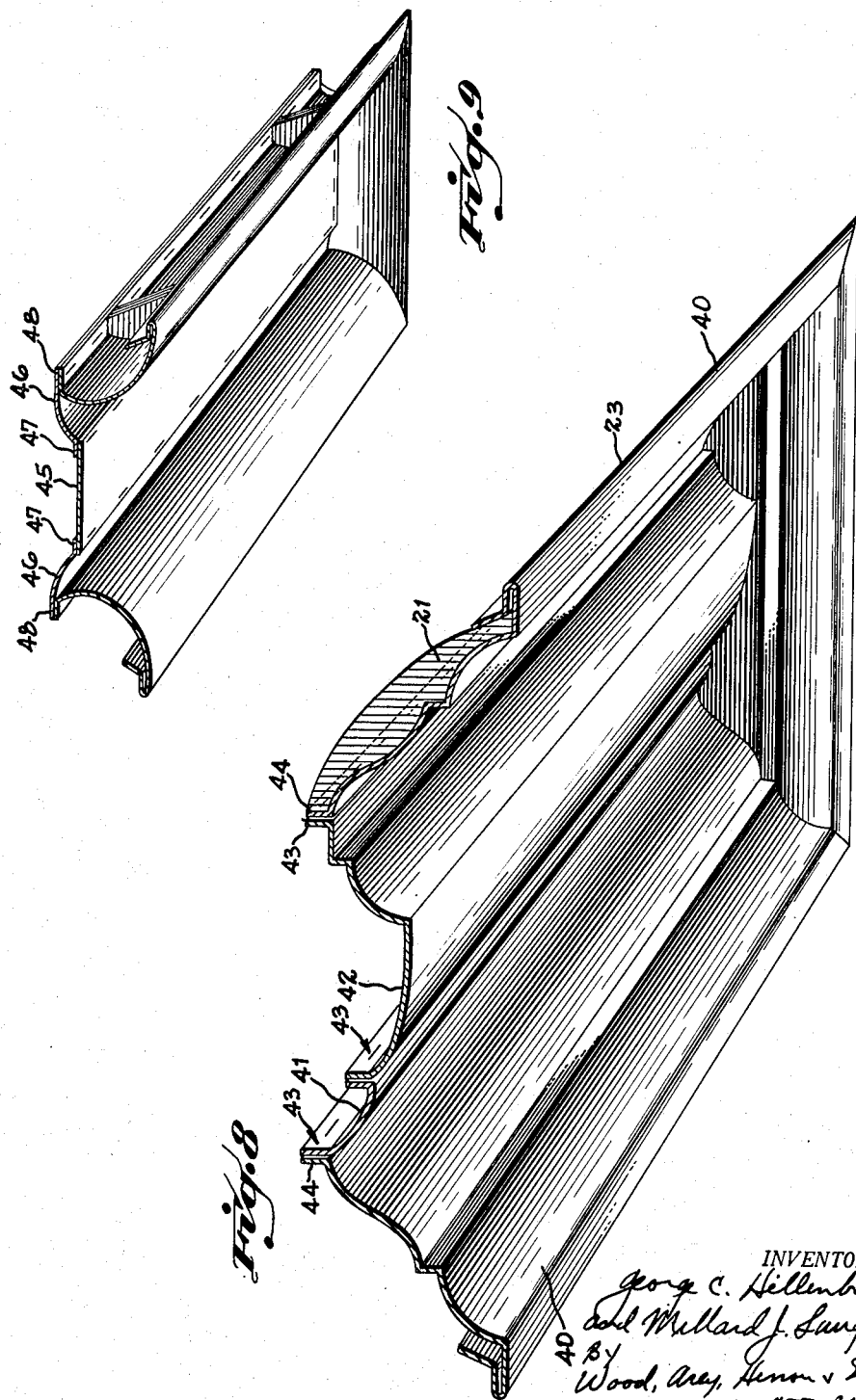

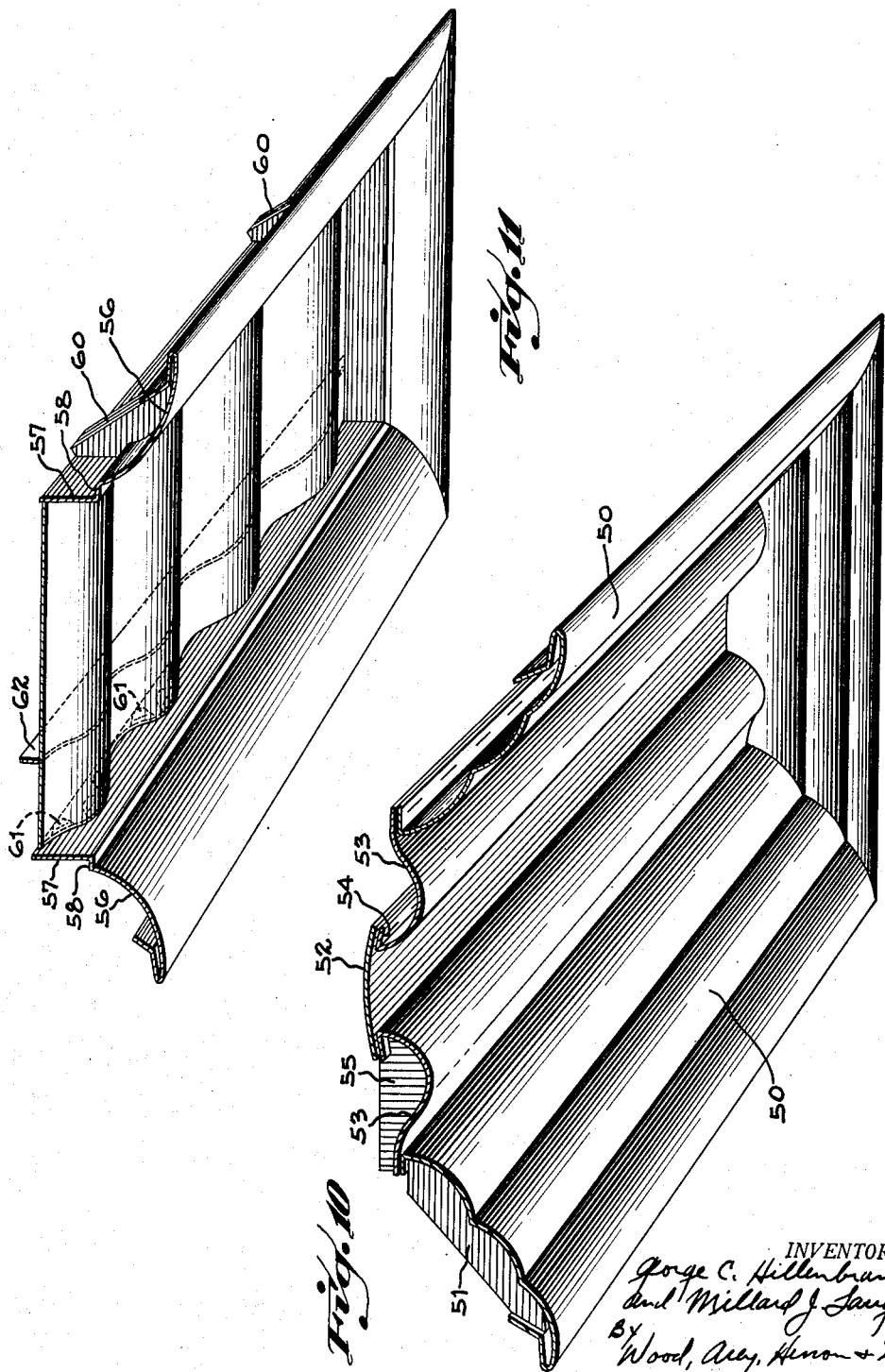

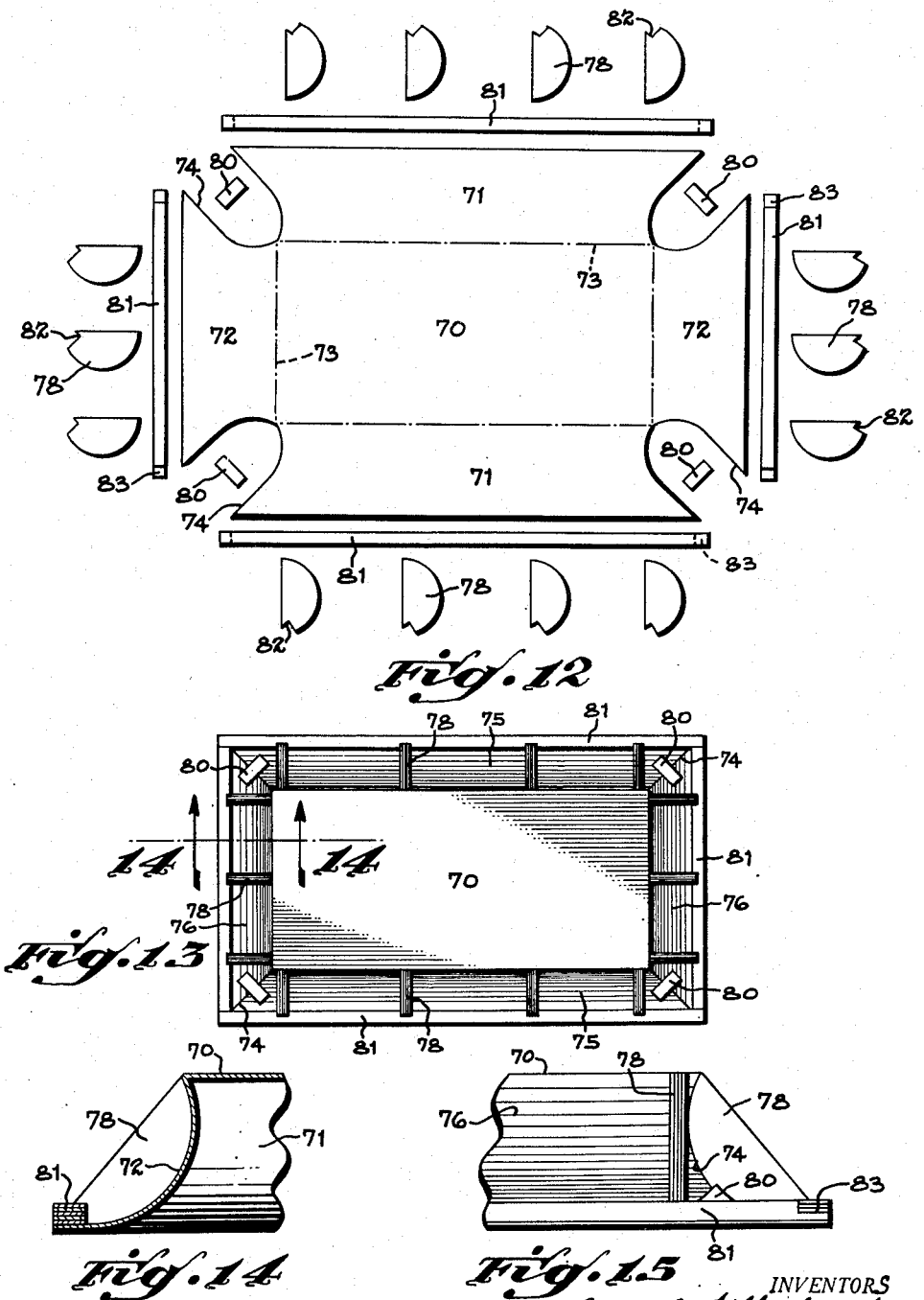

Patented Jan. 5, 1954

2,664,615

UNITED STATES PATENT OFFICE 2,664,615

CASKET INTERIOR UNIT

George C. Hillenbrand and Millard J. Laugle, Batesville, Ind., assignors to The Batesville Casket Company, Batesville, Ind., a corporation of Indiana Application July 24, 1950, Serial No. 175,599

13 Claims. (Cl. 27—19)

This invention relates to casket top interior units for both full couch and half-couch caskets and is particularly directed to interior units for caskets having a dome type of top.

The object of the present invention is to provide interior units for casket tops which may be mass produced and installed by unskilled labor. A second object of the invention is to provide such interior units which have the additional advantage of greater latitude in decorative configuration than has been possible by means of the upholstering methods of the past.

According to the present invention, the interior units are fabricated of paper board covered with casket upholstery fabric. The paper board may be configurated to simulate the effects which the upholsterer achieves or may be configurated to provide forms difficult or impossible to attain by conventional upholstery methods. The interior units of this invention comprise four paper board, trussed, frame members and a center panel which is preferably of one piece of paper board, but may, if desired, be fabricated from several. These interior units may be fabricated and assembled apart from the caskets, then tacked in final position at the proper point in the assembly line. The work of making the interior unit is an operation completely separate from that of fabricating the casket or top, so appropriate surpluses may be developed in anticipation of actual needs.

Although any type of paper board material or papier-mâché may be used to constitute the structure of the molded interior unit, we prefer to use corrugated paper board for two reasons, one of which is that it is inexpensive. The second reason for our preference to corrugated paper board is that we have found that, particularly as to the frame members, the corrugated paper board lends itself admirably to simulation of a genuinely upholstered roll or puff such as is conventionally placed about the margin of the upholstered top interior of the casket. This simulation is best effected by bending the corrugated paper board which constitutes the frame members so that the corrugations run the long way in the frame members. Preferably, corrugated paper board is used which has but one facing, the corrugations being exposed on the other side, and the paper board bent so that the corrugations are on the concave side of the frame member away from the covering material. It is found that such bending accentuates the corrugations and makes them more ridge-like thereby imparting far greater longitudinal rigidity to the frame members.

The central panel which is mounted within the frame may be fabricated from corrugated paper board or any other desired type of cellulosic material.

The unitary construction of the casket interior unit makes it possible to abandon the use of the skeletal framework which has been required in the past for supporting upholstered interiors. In past casket construction it has been the practice to fasten the center panel of the interior to wooden ribs or the like which were mounted upon the marginal tacking strips in the casket top. In the present construction, the center panel is supported entirely by the frame members. In fact, the main strength of the unit is in the trussed frame; however, this is augmented by the formed center panel. Thus, the interior unit does not need skeletal framework support, the marginal tacking, by which the unit is fastened to the marginal strips in the casket top being sufficient.

Other objects and advantages of the present invention will be apparent from the following detailed description of the drawings in which:

Figure 3 is a plan view showing the side of the interior unit which is normally exposed to view when installed in a casket top.

Figure 4 is a cross-sectional view taken on the line 4—4 of Figure 1, the view being somewhat diagrammatic in that the corrugations and details of the casket lining material are not shown.

Figure 5 is an enlarged fragmentary view of the upper end of the interior unit shown in Figure 4, taken on the line 5—5 of Figure 2.

Figure 8 is a perspective view, showing one edge in cross-section of a modified form of the present invention.

Figures 9, 10, and 11 are views similar to Figure 8 showing other modifications of the invention.

Figure 12 is a diagrammatic view showing the respective parts of a modified form of the invention in which the frame members and the central panel are formed from a single piece of paper board material.

Figure 13 is a top plan view of the form of the invention shown in Figure 12 illustrating the back of the assembled unit.

Figure 14 is a fragmentary cross-sectional view taken on the line 14—14 in Figure 13.

Figure 15 is a fragmentary elevational view showing one of the corners of the interior unit of Figure 13.

In order to illustrate a preferred embodiment of the invention a half-couch type casket interior unit is disclosed, but it will be apparent that the same construction is adapted for full couch units.

Figures 1, 2:
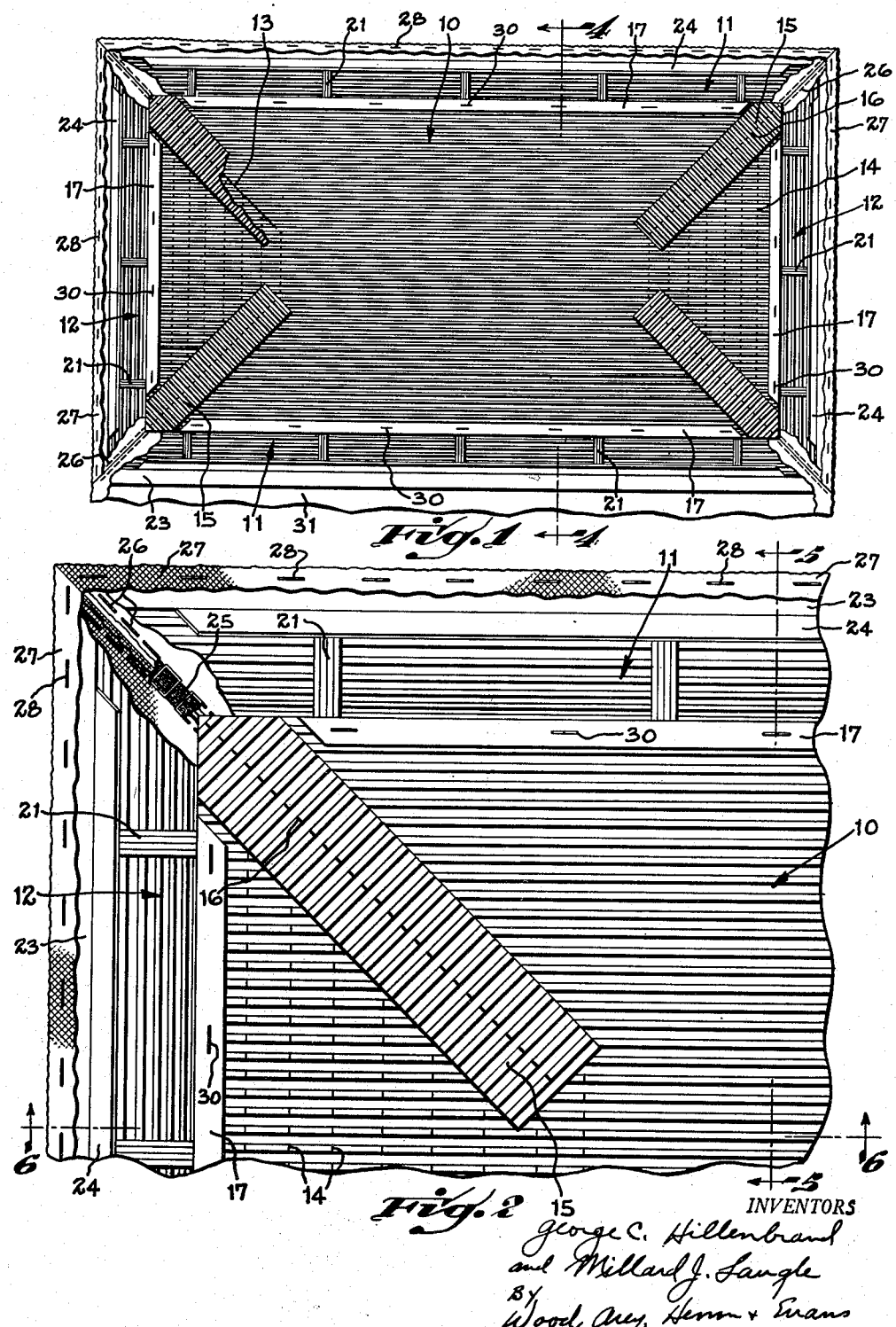
Figure 1 is a plan view of the top of a casket interior unit, showing the side of the unit which resides adjacent the dome of the casket; this particular unit being designed for use in half-couch type caskets.
Figure 2 is an enlarged fragmentary view of the upper left hand corner of the unit shown in Figure 1.
Figure 6:
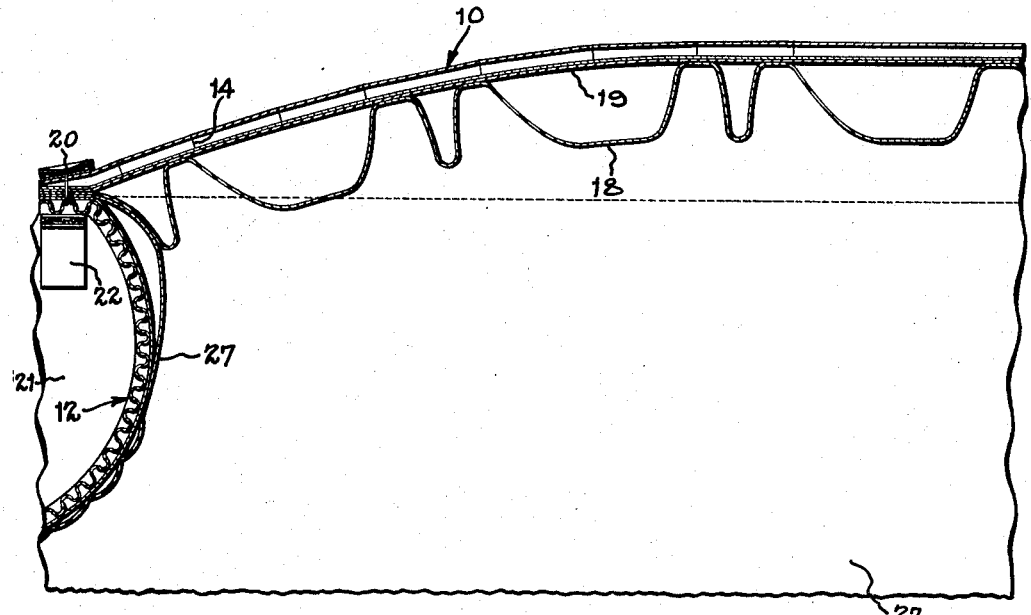
Figure 6 is a fragmentary cross-sectional view taken on the line 6—6 in Figure 2.

The preferred material for the basic parts of the interior unit is corrugated paper board having only one facing. It has been found that this particular material, when formed into the shapes of the various members of the unit, has exceptional strength. Referring to Figure 1 in the drawings, the members comprising the unit are indicated generally as follows: the central panel at 10, the longitudinal frame members at 11—11 and the lateral frame members at 12—12. The construction of the panel and frame will be discussed below under separate headings.

The central panel

The panel 10 is best shown in Figures 1, 2 and 5. The panel disclosed in these figures is configurated generally in the conventional shape utilized in the past for upholstered caskets, in that the exposed face of the panel is slightly concave. It has been found that this general configuration can be attained by utilizing a rectangular sheet of cardboard of the type described, in which slots are cut inwardly at the four corners, roughly at 45° to the respective side edges of the sheet, with the slots tapering from the respective corners inwardly to a point. When a panel thus slotted is formed into a shallow dish-like configuration the slots close as shown at 13. Preferably, the corrugated sheet is cut with the corrugation lines extending the long way of the panel. Upon shaping of the panel material, the longitudinal corrugations form readily into the curved portions along the two sides. However, in the endwise portions of the panel the curves which are in line with the corrugations should be stress-relieved by crosswise slits of the type shown at 14. In the preferred construction, these slits extend only through the upper portions of the ridges.

When the panel 10 is formed into the dish-like configuration and the corner slots 13 closed, the panel is held in shape by backing strips 15 which are fastened by glue at the four corners atop the back and overlapping the respective slots 13. Inasmuch as each backing strip must conform to the curvature of both the side of the panel and the end of the panel, the strips 15 are placed with the corrugated ribs of the material on the exposed side, and slit as at 16 crosswise of the ribs to relieve the bending stress. Along the four sides of the central panel tacking strips 17 are provided, these strips being glued in place and terminating short of the respective backing strips 15. The central panel thus formed is shaped into a structurally strong sub-assembly which is self-supporting and readily able to withstand handling incident to its being joined to the other members of the interior unit.

Preferably the panel is covered on the exposed side by casket lining material such as is shown at 18, and which is formed into the soft ruffles shown in Figure 3. The lining material may comprise a facing of silk, rayon or the like which is backed by relatively stiff buckram-like material, shown at 19 in Figure 5, to which the facing may be affixed in ruffle arrangement by adhesive, stitching or the like. The backing material may be glued directly to the inner surface of the central panel, and the side edges of the casket lining material and backing glued or stapled marginally to four edges of the panel as shown at 20. If desired, the backing material 19 may be omitted and white ink or paint used on the inner surface of the central panel to provide an opaque background for the casket lining material.

The central panels may be formed in configurations heretofore impossible with conventional upholstering methods. Several such configurations which may be formed will be discussed in detail below under the heading, "Modifications."

Trussed frame members

Each of the frame members 11 and 12 is formed in the same way and the corrugated paper material which is utilized for the central panel used in their constructions; that is, corrugated paper having but one facing. The facing in this instance is also on the sides of the members which are exposed when the casket lid is open; and, as has been suggested in connection with the central panel, the exposed side of each frame member may be painted or inked in white to provide an opaque background for the casket lining material. It will be noted that the construction of the frame members lends itself to jig-type forming operations in which the jig is shaped to the curved outline of the individual frame members. Each frame member comprises a length of corrugated paper, having the lines of corrugation extending the long way, which is bent into a shape which is roughly hemispherical in cross-section. The curved shape is maintained by a plurality of webs 21 which are cut in profile to correspond to the desired curvature of the frame members. Preferably, the webs comprise several thicknesses of corrugated paper material, and are held in place against the ribbed side of the frame member paper by means of glue. In addition, angular corner tabs 22 may be provided at the webs, one leg of each corner tab being glued to its inner surface of the formed frame member and the other glued to a face of a web. These tabs 22 may be utilized only along the side of each of the frame members which is adjacent the central panel, see Figure 5. The outer edge of each of the frame members is formed by doubling the corrugated paper material back upon itself to provide a tacking flange indicated at 23. In order to further strengthen the frame member, the turned back edge of the frame material may be glued to the outer edges of the webs as at 24, see Figure 2.

Both ends of each frame member are mitred. In addition both ends include tabs or flanges 25 which are turned at right angles inwardly from the outer face of the member so that when two frame members are joined in right angular mitred fashion, the tabs 25 of the respective frame members lie face to face and are adapted to be secured together by wire staples as shown at 26.

It is preferred that each one of the frame members 11—12, in addition to the center panel, comprise a sub-assembly which is complete in and of itself. Toward this end, casket lining material 27 is placed on each one of the frame members and secured to it prior to assembly of the interior unit. Referring again to Figure 2, it will be noted that the casket lining material for the frame members is lapped around the outer marginal tacking flange 23 and stapled to it as at 28. In addition, the casket interior material is glued or stapled to the inner marginal edge of the frame member. Far more important, and in order to simulate general upholstery techniques, the casket lining material at the two ends of each of the frame members is turned around the mitred corners over the end tangs or tabs 25. Thus, when two of the frame members are joined in right angular mitred fashion, the casket lining material is within the crevice between the two members, as in roll or puff upholstery construction utilized in the past. The staples or wire stitching 26 utilized at the respective corners of the frame and engaged through the tabs 25 also pass through those portions of the lining material which are within the crevice at the jointure of the two members and are thus secured therein.

*Assembly and installation*

Now referring to Figure 3. As pointed out above, the four trussed frame members 11 and 12 are secured together at the corners by means of the wire stitching or stapling 26 which passes through the tabs 25. In assembly, preferably, the rectangular frame is completed, and then the central panel secured to it by stapling or stitching as shown at 30 in Figure 1. The assembly thus provided is a unitary structure having the marginal flanges 23 of the respective frame members extending around the four sides. One of the frame members, the one which is to be adjacent the hinge side of the casket top includes a drape-like skirt 31 of the casket lining material which is not turned back around the marginal flange 23 of this particular member as is done at the other three sides. When the interior unit is installed, the skirt hangs down into the casket along the rear wall in soft folds hiding the hinge mechanism between the top and the rear wall. Inside of the casket the skirt may be arranged to blend in with the upholstery of the other three walls.

Figure 7:
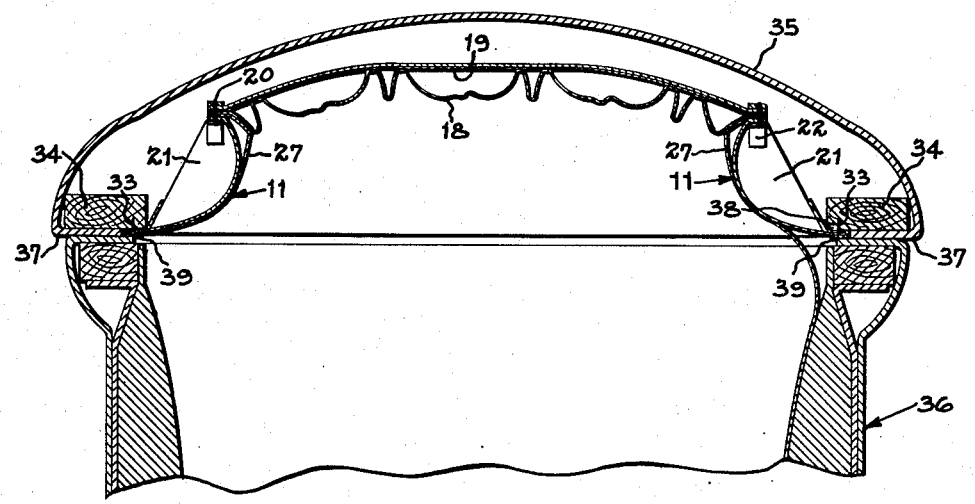
Figure 7 is a fragmentary cross-sectional view through the upper portion of a conventional casket showing an interior unit, made in accordance with the present invention, secured in place.

Referring now to Figure 7, the interior unit is secured in place by means of staples or tacks 33 which pass through the marginal flanges 23 of the trussed frame members 11 and 12 and into the wooden tacking strips 34 which are customarily provided around the four sides of a casket top. In this figure, the domed top is indicated at 35 with the lower portion of the casket being indicated generally at 36. It is to be noted that the domed top 35, as is the usual practice, is provided with flange portions 37 which turn inwardly beneath the strips 34 leaving a notched-out inner edgewise portion 38 of the strips exposed, to which the interior unit is secured. The heads of the tacks or staples 33 may be covered according to conventional upholstering methods by means of decorative tape 39 which extends around the four sides just inwardly of the inturned flanges 37—37 of the domed casket top.

Figure 7 illustrates quite clearly that the central panel of the unit is supported solely by the frame members. The casket illustrated in Figure 7 has a domed top which is formed from a single piece of metal, and it has been the practice to secure the central panel in upholstered interiors to wooden skeletal framework which is supported from the marginal tacking strips 34 by means of brackets or the like. The present construction makes unnecessary such skeletal framework inasmuch as the interior unit is tacked directly to the tacking strips. In other casket top constructions, the lid is formed in two pieces, comprising a rolled marginal piece and a central lid piece which is attached to the marginal piece. In casket tops constructed in this way, it has been the custom to secure the central panel to a second set of tacking strips which are supported within the casket top at the joint between the central lid and the marginal pieces. In order to provide an appropriate seat for the second set of tacking strips, one or the other of the pieces, either the lid or the marginal piece usually were configurated to provide attaching flanges. The present invention not only makes the second set of tacking strips unnecessary, but, of course, the flange construction is not needed, thus simplifying the construction.

*Modifications*

Figures 8, 9, 10 and 11 show interior units of modified form which are configurated to provide decorative shapes not readily attainable by conventional upholstery methods. These particular constructions are representative only, it will be apparent that a great number of different forms and shapes are possible.

Each of the figures showing the modifications are somewhat diagrammatic in nature, in that they do not show the ribs of the corrugated paper material. However, it will be understood that it is preferred that this material be utilized because of its excellent strength characteristics when shaped into the various configurations shown. In addition, as disclosed in the description of the preferred form of the invention, the lines of corrugations should in every instance where it is possible to arrange it, extend longitudinally of the frame members and central panel.

In the modification shown in Figure 8, the frame members indicated at 40, include the usual marginal flanges 23 and web members 21; but, in this instance, the frame members are formed in concave-convex curves with the inner surfaces of the webs 21 following the outlines of the curves. Figure 8 illustrates in particular, that it is not necessary in the construction of this invention that the central panel be symmetrical. In the instance shown, the central panel is made in two sections 41 and 42, each of which includes a pair of marginal tacking flanges, indicated generally at 43, which extend along the respective longitudinal edges of the panel sections, and which are turned upwardly toward the interior of the casket dome and stitched to each other centrally and stitched marginally to flanges 44 which are provided along the upper edges of the frame members 40. At the two ends, the sections 41 and 42 comprising the central panel may include tabs (not shown) which are turned up and stitched or stapled to the respective end frame members.

The casket lining material is not shown in Figure 8, nor in the other figures showing modifications, but it will be understood that such material is secured in place on each of the members prior to assembly in the manner described previously. Also, in this modification and all modifications, the corners of the frame members are mitred in the manner disclosed previously, the tabs 25 at the mitred corners when stitched together increasing the rigidity of the frame members.

In Figure 9, the frame members are quite similar to the ones described previously. However, in this instance, an offset central panel is utilized which comprises a flat center plate 45 which is supported along the upper edges of the frame by curved connecting strips 46. The strips 46 have tacking or stitching flanges 47 and 48 at the respective longitudinal side edges thereof which are affixed respectively to the marginal edges of the center plate 45 and the upper edges of the frame members.

In the modification shown in Figure 10, the side members each comprise a series of rolls of the corrugated material as at 50. Here again, the curvature provided in the rolls 50 and the webs 51 augment the longitudinal rigidity of the frame members. The center panel, in this instance, comprises three parts, in which the central portion 52 is concave and the two outer portions 53 convex. The outer marginal edges of the three parts making up the central panel are secured to the upper edges of the frame members in the same manner of the modification shown in Figure 9. However, in the present form, the central portion 52 of the panel is secured to the side portions 53 at out-turned flanges 54 which are doubled back from the inner edges of the side portions 53 and stapled to the marginal edges of the portion 52. If desired, the portions 53 of the center panel may be strengthened by webs 55 in the same way that the webs 21 are used.

In Figure 11, each of the frame members includes the inwardly curved portion 56, made similarly to the side members 11—12 previously described, but in this instance, the inner or upper ends of the respective frame members terminate in upturned flanges 57. Each flange 57 may be offset inwardly by providing a small shoulder 58 between the flange and the curve portion 56 of the frame member. Appropriately configured webs 60 may be employed to strengthen the frame members. The center panel in this modification is undulated and secured to the flanges 57 by means of tabs 61 which are turned upwardly from the side edges of the panel. In addition, the panel may be strengthened by the upright stringer member 62 which is cut to match the undulated shape of the panel and secured to the upper side thereof by glue. In the modification of Figure 11, the direction for the lines of corrugations may be reversed so that they extend laterally in the central panel in order to facilitate shaping the panel into the undulated form.

In Figures 12 through 15 another form of construction for the casket interior unit of our invention is shown. In this form the frame members and the central panel are constructed from a single sheet of paper board. In the present instance, corrugated paper is used having a conventional double facing. The blank from which the panel and frame members are formed is died out as shown in Figure 12, the central panel portion being indicated by the numeral 70, the side frame member portions by 71—71 and the end frame member portions by 72—72. In Figure 12, the frame members are defined from the central panel by dot-dash lines 73, the dot-dash lines representing score lines for folding.

It is preferred also in this form that the frame members 71 and 72 be configurated to simulate rolled or puffed upholstery and thus the respective ends of the frame members are cut arcuately as shown at 74 so that the frame members after being formed may be joined together at mitred corners. The curvature of ends 74 will depend, of course, on the particular profile desired for the rolled frame members and can be arrived at by simple drafting techniques using well-known surface development methods. In order to make the unit as rigid as possible the corrugations of the paper board material used should run lengthwise of the unit. Thus, there is no particular problem in forming the two side frame members 71—71 into the rolled configuration inasmuch as the corrugated ribs run lengthwise in these members. However, in order to insure a smooth appearance to the exposed convex face of the side frame members, the inner surfaces of each member may be scored lengthwise along the rib lines as shown at 75—75 in Figure 13. At the two end frame members 72—72 rolling into the preferred configuration is somewhat more difficult in that the corrugated ribs extend with the curvature and must be broken in order to bend the members into the desired shapes. For this purpose score lines 76 similar to score lines 75 may be used. Preferably the lines 76 are spaced rather closely and are formed deeply into the material so that a smooth curve is obtained.

In this form, as in the preferred form of the invention, reinforcing webs 78 are utilized in order to strengthen the frame members, these webs being cut in profile to conform to the desired curvature of the members. After the frame members have been formed they may be joined at the mitred corners by means of straps 80 of paper board material which are glued to adjacent frame members, overlapping the crevice between them. At each of the outer margins of the four frame members tacking strips indicated generally at 81, are provided. These tacking strips are either glued or stapled in place along the outer edge of each member, and in order to accommodate these strips, the webs are notched out as at 82. Preferably, the notched out portion of each of the webs is glued directly to the strip. Referring to Figure 15, each tacking strip may be formed from several thicknesses of corrugated material which are glued together to provide a relatively stiff, laminated structure which when glued or stapled onto the marginal edges of the frame members serve to strengthen considerably the complete unit. The tacking strips 81 overlap one another at the four corners of the unit at mortised joints, one of which is shown at 83. In order to provide such a joint both ends of each tacking strip are notched out to a depth equal to one-half of the thickness of the strip. Thus with the straps 80 glued over the crevices and the mortised joints 83 glued together the corners are held together quite securely.

This particular modification is a little more difficult to cover with casket lining material than the preferred construction inasmuch as there are no exposed edges on central panel 70 nor are there exposed inner edges along the respective frame members. However, it has been found that if separate sheets of casket lining material are used for each of the frame members that they can be glued or stapled in place at the inner edge of the frame and these edges hidden by the casket lining material used for covering the central panel.

It is possible in this modified form to tuck the ends of the covering material for each of the frame members into the crevice at each of the mitred corners. This may be accomplished by means of a sharp tool after the unit is entirely assembled or it may be done prior to the time that the straps 80 and the mortised corners 83 of the tacking strips are joined together; thus resulting in an appearance which is substantially like that of the preferred form of the invention. At the outer marginal edges of the casket lining material may be lapped around the tacking strips as is shown in the preferred embodiment discussed above. If desired, the unit may be covered by a single sheet of casket lining material. Inasmuch as the material can be glued in place, the sheet may be folded within the crevice along the score lines 73 and then draped out over the frame members being cut appropriately to fit into the mitred corner crevices.

It has been found that the technique employing opaque ink or paint for covering the outer faces of the various paper board members, mentioned above, may be used to provide rather unusual decorative effects. Ordinary casket lining material is rather thin so that the color tone, at least, of the background shows through it. When white lining material is used, white ink or paint may be used for a background coat so that the brown color of the paper board does not show through. In addition, however, a white background may be used with colored covering material, the whiteness of the paint or ink reflecting through the material giving it a softer appearance. On the other hand, it has been found that deep colors may be used for the background coating and covered by light lining materials. Thus, with a light cream colored lining material, the background may be painted a deep red in order to modify the appearance of the material slightly, the red background giving a mellowness to the appearance of the material. These examples are merely representative of any number of combinations of backgrounds and coverings which may be employed to advantage.

The corrugated paper board material from which the disclosed units are fabricated has many advantages over other materials. However, its use in the constructions shown is not critical. Other materials, such as papier-mâché, plain cardboard or laminated paper board may be utilized. In using materials which are not particularly resistant to bending, it is suggested that the number of reinforcing webs be increased; and that configurations such as the shallow dish shape of the central panel of the preferred embodiment be strengthened by gluing a sheet of material to the back of the part. Practically any sheet-like material may be utilized for constructing the interior units of this invention and, in addition, fastening means other than stapling or tacking may be employed for joining together the parts making up the units. For example, rivets may be used throughout the units or, if desired, all parts may be joined together by glue. Also it is not critical that the completed units be secured into casket tops by tacks and tacking strips as shown, inasmuch as the assembled units are equally well adapted to be secured in place by means of glue or other fastening means.

Having described our invention, we claim:

1. An interior unit for a casket top comprising four frame members, each constituted by paper board material and each configurated at each end to provide mitred joints at each corner of the frame, flanges at each end of each frame member turned inwardly toward the casket top, casket lining fabric covering the face of each frame member including its inwardly turned flanges, means securing said inwardly turned flanges together thereby holding said frame members together to constitute a rigid frame with mitred corners having casket lining fabric in the mitre crevices, and a central panel of paper board material faced with casket lining fabric, said panel secured to the inner edge of the frame to constitute an assembled interior unit of upholstered appearance adapted to be inserted as a unit in the top of the casket.

2. An interior unit for a casket comprising four frame members each constituted by corrugated paper board having its corrugations disposed lengthwise of the member and each configurated at each end to provide mitred joints at each corner of the frame, flanges at each end of each frame member turned inwardly toward the casket top, casket lining fabric facing each frame member including its inwardly turned flanges, means securing said inwardly turned flanges together thereby holding said frame members together to constitute a rigid frame with mitred corners having casket lining fabric in the mitre crevices, and a central panel of paper board material faced with casket lining fabric, said panel secured to the inner edge of the frame to constitute an assembled interior unit of upholstered appearance adapted to be inserted as a unit in the top of the casket.

3. An interior unit for a dome topped casket comprising four frame members each constituted by corrugated paper board having its corrugations disposed lengthwise of the member and each configurated to display a convex face outwardly and at each end to provide mitred joints at each corner of the frame, flanges at each end of each frame member turned inwardly toward the casket top, lining fabric facing each frame member including its inwardly turned flanges, means securing said inwardly turned flanges together thereby holding said frame members together to constitute a rigid frame with mitred corners having casket lining fabric in the mitre crevices, and a central panel of paper board material faced with casket lining fabric, said panel secured to the inner edge of the frame to constitute an assembled interior of upholstered appearance adapted to be inserted as a unit in the dome top of the casket.

4. An interior unit for casket top comprising four frame members each constituted by paper board material and each configurated to display a curved face outwardly and at each end to provide mitred joints at each corner of the frame, flanges at each end of each frame member turned inwardly, means securing said inwardly turned flanges together thereby holding said frame members together to constitute a rigid rectangular frame, a central panel of paper board material, said panel secured to inner edgewise portions of said frame members, and outer edgewise portions of said frame members adapted to be secured to the marginal tacking strips of a casket top.

5. An interior unit for a casket top comprising a self-sustaining rectangular frame having side and end members each of which is constituted by paper board material configurated to display a curved face outwardly, a plurality of webs secured to the inner face of each of the members to maintain the curvature of the outer face thereof, a central panel of shallow dish-like configuration secured marginally to the inner edge of the rectangular frame, and outer edgewise portions of said frame adapted to be secured to the marginal tacking strips of a casket top.

6. An interior unit for a casket top comprising a rectangular frame having side and end members each of which is constituted by paper board material configurated to display a curved face outwardly and each of which is configurated at its respective ends to provide mitred joints at each corner of the frame, a plurality of webs secured to the inner face of each of the members to maintain the curvature of the outer face thereof whereby the members collectively constitute a self-sustaining frame, a central panel of paper board material, said panel secured marginally to the inner edge of the rectangular frame, and outer edgewise portions of said frame members adapted to be secured to the marginal tacking strips of a casket top.

7. An interior unit for a casket top comprising a rectangular frame having side and end members each of which is constituted by paperboard material configurated to display a curved face outwardly and each of which is configurated at its respective ends to provide mitred joints at each corner of the frame, a plurality of webs secured to the inner face of each of the members to maintain the curvature of the outer face thereof, means fastening the respective members to one another at the mitred joints whereby the members collectively constitute a self-sustaining frame, and a central panel secured marginally to the inner edge of the rectangular frame.

8. An interior unit for a casket top comprising a rectangular frame having side and end members each of which is constituted by paper board material configurated to display a curved face outwardly, the respective ends of each of the members configurated to provide mitred joints at each corner of the frame, tabs at the respective ends of each frame member, said tabs turned inwardly toward the casket top, means fastening said inwardly turned tabs together thereby securing said frame members together, a marginal flange turned outwardly from the inner edge of each of the frame members, and a central panel secured marginally to the marginal flanges of the respective frame members.

9. An interior unit for casket comprising four frame members each constituted by paper board material configurated to display a curved face outwardly and each configurated at each end to provide mitred joints at each corner of the frame, tabs at each end of each frame member turned inwardly toward the casket top, casket lining fabric facing each frame member including its inwardly turned tabs and respective side edges, means securing said inwardly turned tabs together thereby holding said frame members together to constitute a rigid self-sustaining rectangular frame with mitred corners having casket lining fabric in the mitre crevices, a marginal flange turned outwardly from the inner edge of each of the frame members, a central panel of paper board material faced with casket lining fabric, and said central panel secured marginally to the marginal flanges of the respective frame members whereby the lining fabric facing the central panel and the lining fabric facing the respective members meet at crevices similar to those effected by genuine upholstery techniques.

10. In a casket interior unit, a rectangular frame having side and end members, each of said members formed of sheet-like material, each member configurated to display a curved face outwardly and to provide mitred joints at each corner of the frame, inwardly turned flanges at each end of each member, casket lining material covering the outer face of each member including its inwardly turned flanges, and means securing together the inwardly turned flanges of adjoining members at each of the four corners of the frame to constitute a rigid, self-sustaining frame with mitred corners having casket lining material in the mitre crevices.

11. An interior unit for a casket top comprising a rectangular frame having side and end members, each of said members being formed of sheet-like material and each member configurated at each end to provide mitred joints at the four corners of the frame, inwardly turned flanges at each end of said members, casket lining material covering the outer face of each member including its inwardly turned flanges, means securing together the flanges at each of the four corners of the frame thereby holding said members together to constitute a rigid frame structure with mitred corners having casket lining material in the mitre crevices, and a central panel of sheet-like material faced with casket lining material, said panel secured marginally to the respective inner edges of said members.

12. An interior unit for a casket top comprising a rectangular frame having side and end members, each member formed of sheet-like material, each member configurated to provide transverse curvature and to provide mitred joints at each corner of the frame, flanges turned inwardly at each end of each member, casket lining material covering the face of each member including its inwardly turned flanges, means securing together the flanges of adjoining members at each of the four corners of said frame and a central panel of sheet-like material, said panel faced with casket lining material and secured to inner edgewise portions of said members.

13. An interior unit for a casket top comprising a rectangular frame having side and end members, each member formed of sheet-like material, each member configurated at each end to provide mitred joints at each corner of the frame, inwardly turned flanges at each end of each frame member, casket lining material covering the face of each frame member including its inwardly turned flanges and its inner marginal edge, means securing said inwardly turned flanges together at each of the four corners of the frame to constitute a rigid frame with mitred corners having casket lining material in the mitre crevices, and a central panel faced with casket lining material including the marginal edges thereof, said panel secured to the inner marginal edges of the respective members to constitute an assembled interior unit of upholstered appearance adapted to be inserted as a unit in the top of the casket.

GEORGE C. HILLENBRAND.
MILLARD J. LAUGLE.

References Cited in the file of this patent

UNITED STATES PATENTS

| Number | Name | Date |
| --- | --- | --- |
| 1,931,828 | Overstreet | Oct. 24, 1933 |
| 2,044,967 | Bowler | June 23, 1936 |
| 2,181,504 | Bowler | Nov. 28, 1939 |